March 22, 1966

J. M. KELLNER ETAL 3,241,357

PERMEAMETER

Filed April 25, 1963

Alexander B. Hildebrandt &
Jackson M. Kellner  INVENTORS.

BY James E. Reed
ATTORNEY.

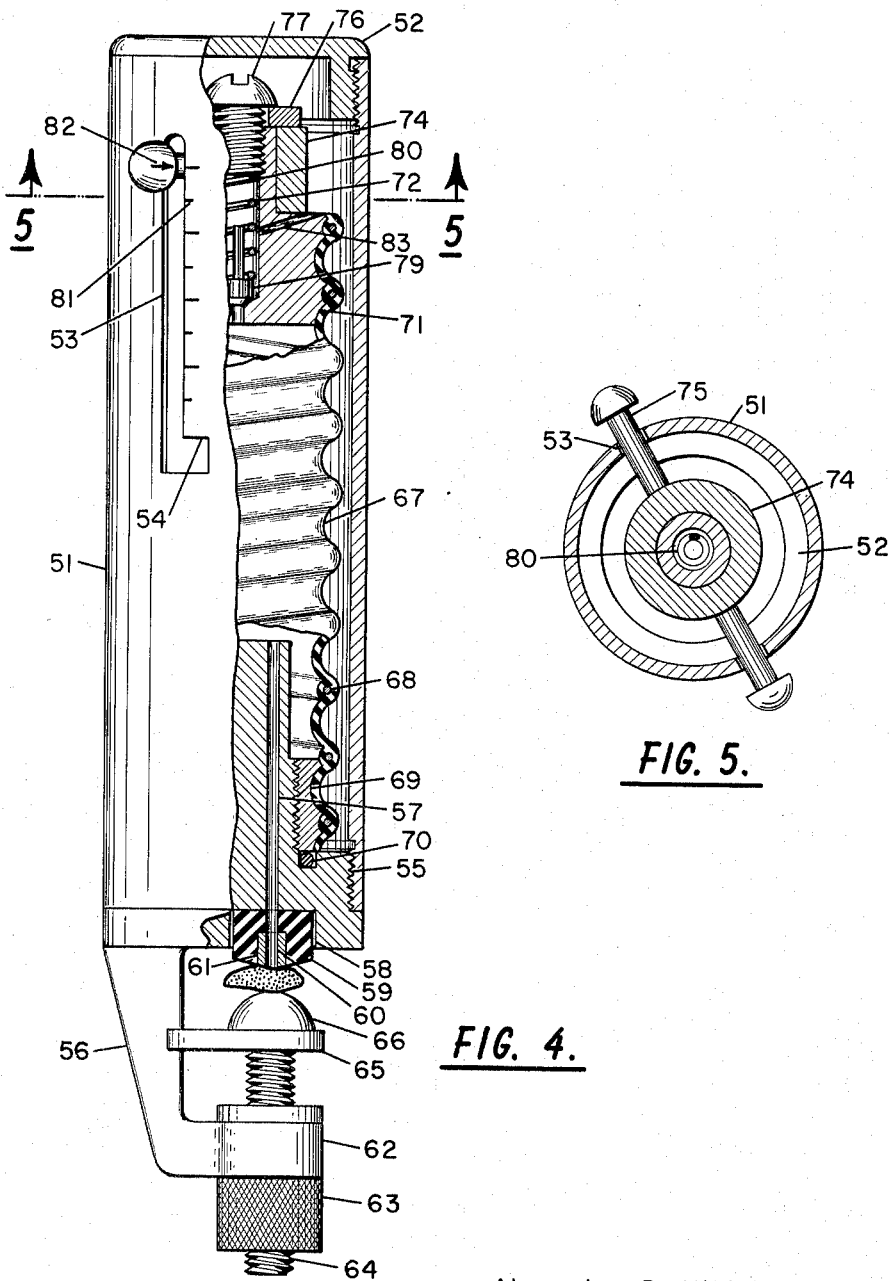

March 22, 1966 J. M. KELLNER ETAL 3,241,357
PERMEAMETER
Filed April 25, 1963 4 Sheets-Sheet 4

Alexander B. Hildebrandt &
Jackson M. Kellner INVENTORS.

BY James E. Reed
ATTORNEY

United States Patent Office 3,241,357
Patented Mar. 22, 1966

3,241,357
PERMEAMETER
Jackson M. Kellner and Alexander B. Hildebrandt, Tulsa, Okla., assignors, by mesne assignments, to Esso Production Research Company, Houston, Tex., a corporation of Delaware
Filed Apr. 25, 1963, Ser. No. 275,702
3 Claims. (Cl. 73—38)

The present invention relates to apparatus for determining the physical properties of solids and is particularly concerned with an improved device for measuring the permeability of drill cuttings, rock chips, and similar materials.

Permeability is an important characteristic of subterranean formations and is widely used in the petroleum industry in evaluating oil and gas reservoirs. The conventional methd for determining permeability is set forth in Code 27 of the American Petroleum Institute entitled, "Standard Procedure for Determining Permeability of Porous Media." This method involves the cutting of a core or other rock sample to a specified size and shape, the mounting of the sample in a special holder, and the forcing of fluid through the pores of the samples for a prescribed period under controlled temperature and pressure conditions. The quantity of fluid which passes through the sample under standard conditions is measured and used to calculate permeability. This method, developed for laboratory use, has serious limitations because of the elaborate equipment required, the time needed for each permeability determination, and the relatively large sample of rock or other material necessary. It has little application in instances where permeability information is needed in the field on short notice. There have been efforts in the past to develop portable permeability measuring equipment which can be used conveniently by well site geologists and other field personnel but such efforts have met with only limited success. The devices developed heretofore have usually been difficult to use, incapable of withstanding rough treatment, and of doubtful reliability. As a result, such devices have generally not proved satisfactory.

It is therefore an object of the present invention to provide an improved device for measuring the permeability of drill cuttings, rock chips and similar particles. Another object is to provide a readily portable device which will permit the determination of permeability under field conditions more rapidly and with greater accuracy than has generally been possible with instruments available heretofore. A further object is to provide a small permeameter which is easier to use and less susceptable to damage than apparatus utilized in the past. Still other objects will become apparent as the invention is described in greater detail hereafter.

The nature of the improved permeameter of the present invention can best be understood by referring to the following detailed description of several embodiments of the device and to the accompanying drawing, in which:

FIGURE 4 is a vertical elevation, again partially in section, of an alternate embodiment of the device;

FIGURE 5 is a cross-sectional view of the permeameter shown in FIGURE 4 taken about the line 5—5.

Figures 1, 2:
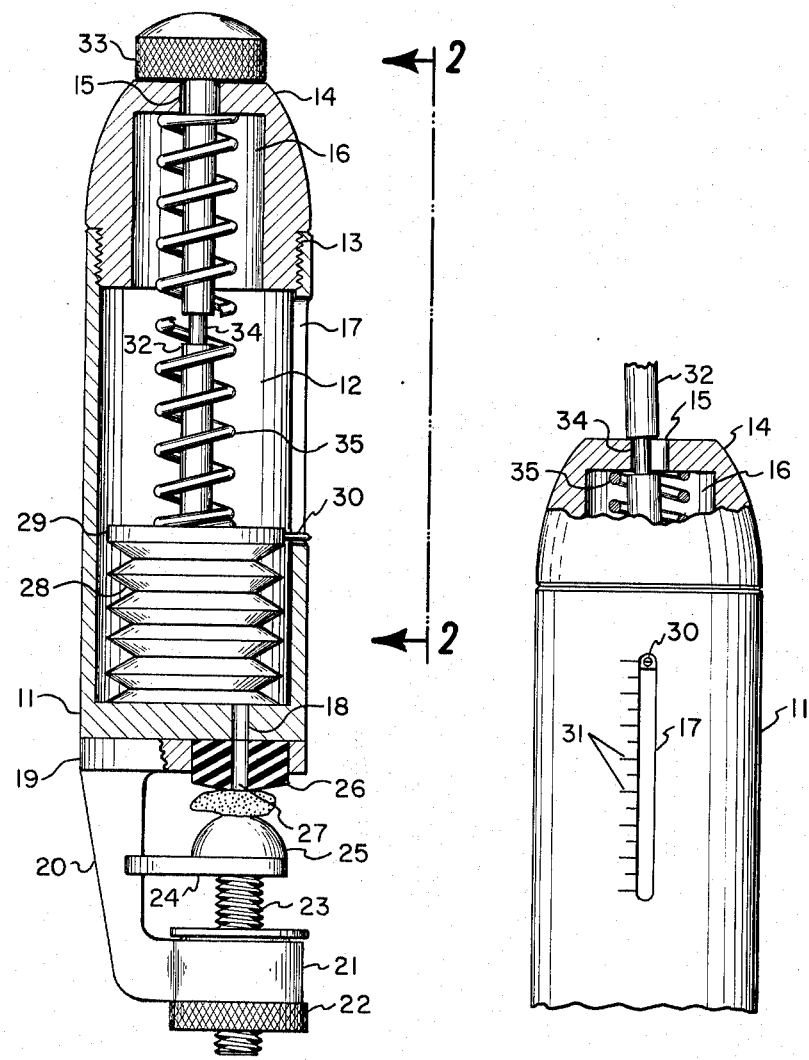
FIGURE 1 is a vertical elevation, partially in section, of an improved permeameter provided with a spring-actuated bellows for displacing air through a sample.
FIGURE 2 is a fragmentary view of the apparatus depicted in FIGURE 1 showing means for measuring movement of the bellows.

The embodiment of the invention shown in FIGURE 1 of the drawing includes a generally cylindrical permeameter housing 11 of steel, aluminum hard plastic or similar material. The housing contains an internal chamber 12 which is provided with internal threads 13 near its upper end for the attachment of a cap 14. The cap includes an axial opening or port 15 extending into a recess 16 of somewhat larger diameter on its under side. An elongated slot 17 extends longitudinally through the housing wall below the threads and cap. A port 18 is provided in the lower end of the housing. The port is preferably off-set from the housing axis as shown.

A chip clamping assembly including an upper base 19 below which a supporting arm 20 extends is bonded to the lower end of the housing in the permeameter shown in FIGURE 1. The base and supporting arm may be constructed as an integral part of the housing if desired. At the lower end of the supporting arm is a collar 21 containing an adjusting nut 22 which is free to turn within the collar. The opening in the adjusting nut is axially aligned with port 18 in the housing. Screw 23 extends through the adjusting nut and is connected to slider 24 which engages inner side of supporting arm 20 to prevent the screw from turning as the adjusting nut is turned. A resilient chip holder 25 made of butyl rubber, soft plastic or other resilient material is mounted on the lower side of the slider and is preferably of hemispherical shape. An upper chip holder 26 of similarly resilient material containing a passageway 27 aligned with port 18 is bonded to the housing within an opening in the upper base 19. The upper holder preferably has a convex lower surface as shown to prevent leakage when a rock chip or similar particle is tested.

A cyclindrical bellows 28 or similar extensible tubular member is mounted within chamber 12 of the permeameter and is bonded to the lower end of the chamber about port 18. The bellows is made of rubber, plastic or other resilient material and may be circumferentially reinforced with internal cords or with a cloth cover. The upper end of the bellows is bonded to a loose-fitting piston-like member or bellows adapter 29 which is not intended to seal against the chamber wall. A pointer 30 is attached to the side of the piston-like member and extends through longitudinal slot 17 in the housing as a means for indicating movement of the member. Reference marks 31, shown in FIGURE 2 of the drawing, are provided on the outer surface of the housing adjacent the slot so that movement of the pointer can be timed. The piston-like member or adapter is connected to a rod 32 which extends upwardly through port 15 in cap 14 to a knob 33. A notch 34 is provided in the rod at an intermediate point between the knob and piston so that the assembly can be locked in an extended position by engaging cap 14. A helical spring 35 extends between the upper surface of the piston-like member and the lower surface of the cap within recess 16 in order to maintain the rod in a normally retracted position. Reference marks may be provided on the rod above the slot for timing purposes if desired, thus eliminating the necessity for slot 17, pointer 30 and marks 31 on the housing.

The apparatus depicted in FIGURES 1 and 2 of the drawing is employed for the determination of permeability by first pulling rod 32 into an extended position by means of knob 33. The rod is locked in place by engaging cap 14 in slot 34. This compresses spring 35 and expands bellows 28. A clean, dry chip or similar particle of the material to be tested is then inserted between lower chip holder 25 and upper chip holder 26. The chip is secured in place by tightening nut 22. The rod is then disengaged by moving it to one side. The spring thereupon expands, pushing member 29 and bellows 28 downwardly in the housing. Air displaced from within the bellows as it contracts is forced through passageway 27 and through the pores in the specimen between the chip holders. The permeability of the specimen is determined by measuring the time required for a given volume of air to flow through the pores. This may be done by timing the movement of pointer 30 between selected marks 31 on the outer surface of the housing. The measured time is inversely proportional to permeability.

The preferred practice in utilizing the apparatus is to first test a series of standard specimens of known permeability and utilize the results obtained with these for the preparation of a calibration curve by means of which the readings obtained from unknown samples can be converted to permeability values. Chips of Alundum, porcelain or other material may be employed as standards. Alundum is a trademark designating aluminum oxide abrasive manufactured by the Norton Company of Worcester, Massachusetts, in bars having extremely uniform permeability. By employing chips of Alundum or porcelain of different grades, a set of satisfactory standards can readily be obtained. For testing samples of subsurface strata, it is generally preferred that the set of standards include chips having permeability values of 1, 3, 10, 50, 100, 250 and 500 millidarcies. The standards employed are not critical and for some purposes it will be found more convenient to utilize chips having other permeabiilty values. The chips used are normally about ⅛ inch thick and measure about ¼ inch along their other two dimensions. It is not essential that the chips be of regular size or shape. Since the air flows through a chip held between the chip holders along radial paths, moderate variations in size or shape have no significant effect upon the measurements obtained with the permeameter.

Figure 3:
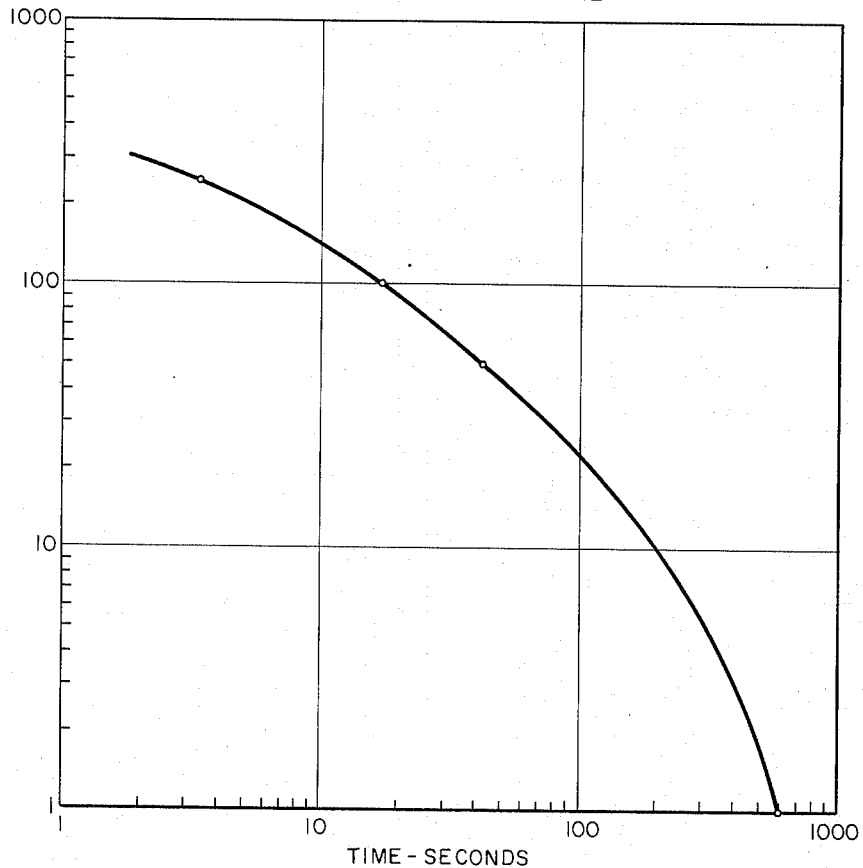
FIGURE 3 shows a typical calibration curve used with the apparatus of the invention.

FIGURE 3 of the drawing shows a typical calibration curve obtained with standard chips of Alundum and porcelain. The time required for pointer 30 to move a selected distance, as measured by reference lines 31 on the outer surface of housing 11, with chips of different permeabilities was measured. The values in seconds were plotted against permeability in millidarcies on logarithmic paper as shown in FIGURE 3. Experience has shown that the curves thus obtained can be readily reproduced as long as the temperature and atmospheric pressure conditions remain essentially unchanged. Since these vary from day to day, a new calibration curve should be prepared each time the permeameter is employed.

Several sample chips will ordinarily be tested with the permeameter and a fresh calibration curve such as that shown in FIGURE 3 of the drawing in order to determine the permeability of a particular stratum. Experience has shown that vugs, grain size variations, clay laminae, very thin streaks of shale, and similar features of individual chips may cause considerable variation in the permeability values obtained and that the use of the average of several values is therefore generally advisable. In some formations, variations in permeability over very short distances will be large and therefore only permeability ranges should be utilized. In general, however, it has been found that the results obtained with the permeameter correlate very well with those obtained by testing cores in the standard A.P.I. Code 27 apparatus. The permeability values obtained with the device of the invention are therefore considered thoroughly reliable.

The embodiment of the invention shown in FIGURES 4 and 5 of the drawing is generally similar to that of FIGURES 1 and 2 but includes a bellows and spring or extensible tube formed as an integral member in place of the structure shown earlier. The housing 51 is an elongated tubular member having a cap 52 threaded in place at its upper end. Slots 53 extend longitudinally in the housing wall from points near the upper end of the housing to intermediate points. Two slots located 180° apart are provided. Each slot includes a notch 54 at its lower end. A chip supporting assembly including a base member 55 and a supporting arm 56 is threaded into the lower end of the housing. The base member contains a passageway 57 and a lower recess 58 within which a resilient upper chip holder of rubber or similar material 59 is mounted. The chip holder contains a passageway 60 aligned with that in the base member. Rigid sleeve 61 is set in the lower part of the holder about the opening therein. Collar 62 containing adjusting nut 63 is aligned with the opening in the upper chip holder. Screw 64 is threaded through the adjusting nut and is connected to a sliding member 65 which engages supporting arm 56. Lower chip holder 66 having a convex surface of rubber or other resilient material is bonded to the upper surface of the sliding member and is aligned with the upper chip holder.

The housing of the apparatus in FIGURES 4 and 5 of the drawing contains an air-impermeable bellows 67 which includes an integral helical spring 68. The spring and bellows are connected at their lower end to a sleeve 69 which is in turn threaded to base member 55. A seal ring 70 seated in a groove in the base member prevents leakage of air from within the bellows. The upper part of the base member extends upwardly into the bellows as shown. By selecting a member of the proper size, the internal volume of the bellows can be varied. The upper end of the bellows and spring are connected to a piston-like member or adapter 71 containing an axial passageway 72. The piston-like member or adapter includes an upper shank upon which is mounted a collar 74 fitted with arms 75. The arms extend outwardly through slots 53 in the housing wall as shown in FIGURE 5 of the drawing. A washer 76 is mounted on the upper end of the shank and held in place by retainer screw 77. The retainer screw also serves to hold plug 79 and helical spring 80 in position within passageway 72. Reference marks 81 are provided on the outer surface of the housing adjacent the slots 53 as shown. A similar mark 82 on the outer end of arms 75 permits timing of the piston as it moves within the housing.

The apparatus of FIGURES 4 and 5 of the drawing is employed in a manner generally similar to that described earlier. To determine the permeability of a chip or similar specimen by means of the apparatus, the piston-like member is first pushed downwardly in the housing by means of arms 75 and locked in place within slots 54 by turning the arms counterclockwise. This compresses the spring and bellows downwardly in the housing. Air initially present in the bellows is forced outwardly through passageways 57 and 60. A rock chip or similar specimen is inserted between the chip holders and secured by turning adjusting nut 63 until both holders are compressed against the chip. The piston-like member is then released by turning the arms in a clockwise direction. The time required for air to flow through the pores of the chip and thus permit movement of the member upwardly in the housing is determined by timing the movement of mark 82 with reference to marks 81. Calibration curves will normally be prepared, using standards of known permeability, each time the apparatus is used.

It will be noted that the embodiment of the permeameter shown in FIGURES 4 and 5 of the drawing includes a check valve in the piston-like member which prevents damage to the bellows in the event that the member is moved downwardly in the housing with a chip or other specimen in place between the chip holders. The pressure created as the bellows is compressed forces plug 79 upwardly against spring 80 so that the excess air is bled off through a passageway 83 in the member. As pointed out previously, the size of the upper part of the base member extending into the bellows can be varied to change the rate at which the piston-like member and bellows assembly moves in the housing. By using a base member having a small upper section when testing specimens of very high permeability, slower movement and hence more accurate timing can be obtained. In like manner, a member having a relatively large upper section may be employed for testing specimens of very low permeability in order to reduce the volume of air which must pass through the specimen and thus permit more rapid testing.

Figure 6:
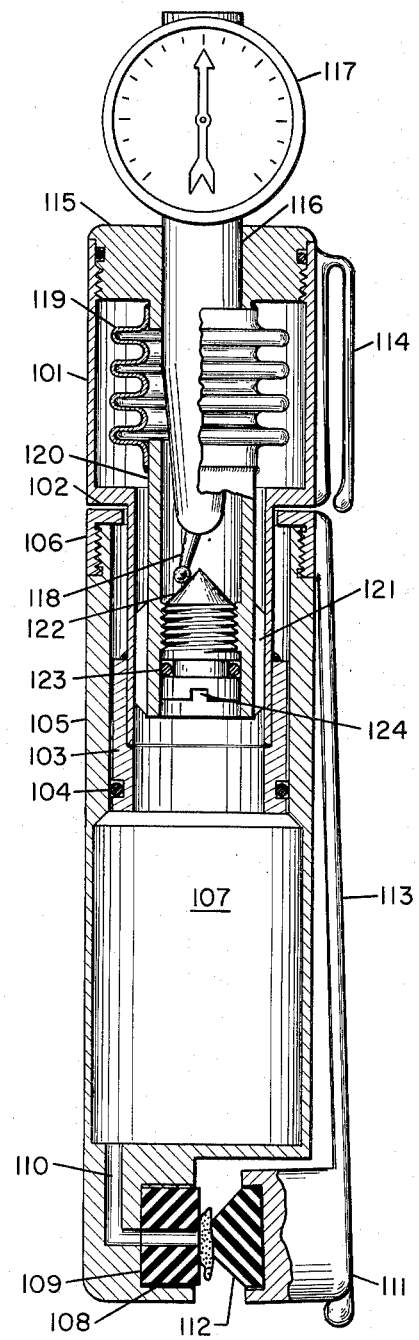
FIGURE 6 is a vertical elevation of a further embodiment of the improved permeameter.

FIGURE 6 of the drawing depicts a further embodiment of the invention which utilizes a dial indicator to measure displacement of an internal bellows as the air flows through a permeable chip or similar specimen. The apparatus of FIGURE 6 includes an outer housing composed of an upper section and a lower section. The upper section 101 includes an external shoulder 102 which faces the lower end of the permeameter. An annular sleeve 103 is bonded to the lower end of the upper section below the shoulder. A seal ring 104 of rubber or similar material is set in a groove in the outer surface of the sleeve. The lower section 105 of the housing fits over the sleeve and the lower part of the upper section of the housing in telescoping relationship. A flange 106 is threaded to the upper end of the lower section. This flange abuts against shoulder 102 when the lower section is in its uppermost position with respect to the upper section and contacts sleeve 103 when the lower section is in its lowermost position.

The lower section 105 of the housing is hollow and includes an internal chamber 107 into which the upper section and sleeve extend. Below this chamber, the lower section contains an opening 108 on one side. A fixed chip holder 109 of rubber or similar resilient material is mounted within this opening. Passageway 110 extends from an inlet at the lower end of the chamber to an outlet at the center of the fixed chip holder. A cover 111 containing a movable chip holder 112 fits over opening 108 and the fixed chip holder. The two chip holders are axially aligned with one another. The cover 111 is held in place by an elongated clamp 113 which extends upwardly over the outer surface of the housing and is secured adjacent flange 106. The clasp permits movement of the cover away from the lower housing section so that a rock chip or similar specimen may be inserted between the chip holders and held there. A pocket clip 114 on the upper housing section is provided to hold the permeameter in place when not in use.

An annular cap 115 is mounted in the upper end of upper housing section 101 in the apparatus shown in FIGURE 6. A dial indicator including a body 116, a face 117 and a pin 118 extends through the opening in the cap into the upper section of the housing. The cap is bonded to the body of the indicator below the face in order to secure a fluid-tight seal. A bellows 119 is bonded to the lower end of the cap about the indicator body. The lower end of the bellows is connected to a sleeve 120 which extends downwardly about the indicator pin in the lower part of the upper section. Ribs 121 on the outer surface of the sleeve serve to center it within the upper body section below shoulder 102 without obstructing the movement of air into and out of the bellows. The sleeve is threaded at its lower end and contains a plug 122 having a conical upper surface against which the indicator pin rests. A seal ring 123 is set in a groove in the plug below the threads to prevent leakage from within the bellows and sleeve. A socket or slot 124 is provided in the lower end of the plug to permit its adjustment.

The dial indicator employed may be of conventional design. A suitable indicator is manufactured by the Brown & Sharpe Manufacturing Company of Providence, Rhode Island, and is identified as Brown & Sharpe Dial Indicator No. 7028.

Suitable bellows are available commercially from the Robertshaw Fulton Controls Company of Richmond, Virginia.

The permeameter shown in FIGURE 6 of the drawing is similar in operation to those described earlier. The lower body section 105 of the device is first moved downwardly with respect to the upper body section 101 so that flange 106 rests against the upper edge of sleeve 103. This increases the internal volume of the device, thus pulling air into chamber 107 through passageway 110. A rock chip or similar specimen of unknown permeability is placed between the chip holders at the lower end of the instrument and carefully centered over the hole in the annular holder. The upper section of the housing is then pushed into the lower section, reducing the internal volume and increasing the pressure in chamber 107. The increased pressure causes bellows 119 to contract. Pin 118 on the dial indicator is forced outwardly as plug 122 moves upwardly with the bellows. As air escapes from chamber 107 through passageway 110 and the pores in the specimen, the internal pressure gradually declines. This is accompanied by an expansion of the bellows and a movement of the plug 122 downwardly within the housing. As the plug moves down, the pin on the indicator moves toward a vertical position. By measuring the time required to go from one reading on the indicator dial to another, an indication of the permeability of the specimen can be obtained. Again it is preferred to utilize a series of standard specimens of known permeabilities for the preparation of a calibration chart each time the permeameter is used and to test a number of specimens from each stratum for which a permeability determination is to be made.

What is claimed is:
1. A permeameter for determining the permeabilities of drill cuttings and similar porous chips which comprises:
 (a) An elongated, generally cylindrical housing containing an elongated internal chamber, a port extending through the housing wall at one end of said chamber, and an opening in the housing wall near the other end of said chamber;
 (b) A bellows assembly positioned within said chamber in said housing, said assembly including an air-impervious bellows having a fixed end attached to said housing in fluid-tight relationship near one end of said chamber and a movable end extending toward the other end of said chamber, a bellows adaptor containing a passageway extending therethrough attached to the movable end of said bellows in fluid-tight relationship, a check valve in said passageway, and a spring in the bellows wall for biasing said bellows and bellows adaptor in a predetermined position within said chamber;
 (c) Means connected to said bellows adaptor and extending through said opening in the housing wall for displacing said adaptor and bellows within said chamber and for indicating the distance said adaptor moves as said adaptor and bellows return to said predetermined position from a displaced position within said chamber;
 (d) An annular chip-holder of resilient material mounted on the outer surface of said housing about said port; and
 (e) Means for clamping a chip of porous material over the opening in said holder so that air passing through the said port as said bellows and adaptor return to said predetermined position passes through the pores in said chip.

2. A permeameter as defined by claim 1 wherein said fixed end of said bellows is attached to said housing about said port.

3. A permeameter as defined by claim 2 wherein said port is located in a removable section of said housing which extends into said fixed end of said bellows.

(References on following page)

References Cited by the Examiner

UNITED STATES PATENTS

| | | | |
|---|---|---|---|
| 2,878,012 | 3/1959 | Crites | 92—42 |
| 2,932,203 | 4/1960 | Peters | 92—40 |
| 2,949,766 | 8/1960 | Kirkham | 73—38 |
| 3,036,456 | 5/1962 | Conti | 73—4 |
| 3,102,416 | 9/1963 | Hill | 73—38 |
| 3,140,599 | 7/1964 | Rahme | 73—38 |

FOREIGN PATENTS

| | | |
|---|---|---|
| 534,148 | 12/1954 | Belgium. |
| 625,982 | 1/1936 | Germany. |
| 191,677 | 9/1937 | Switzerland. |

ISAAC LISANN, *Primary Examiner.*

B. DONAHUE, *Assistant Examiner.*